United States Patent [19]
Will

[11] 4,439,108
[45] Mar. 27, 1984

[54] WINDMILL HAVING CENTRIFICALLY FEATHERED ROTORS TO CONTROL ROTOR SPEED

[76] Inventor: Richard Will, R.D. #2 Dutch Rd., Waterford, Pa. 16441

[21] Appl. No.: 386,431

[22] Filed: Jun. 8, 1982

[51] Int. Cl.³ .............................................. F03D 7/04
[52] U.S. Cl. .................................... 416/131; 416/135; 416/202; 416/44
[58] Field of Search ................. 416/135 A, 11, 142 B, 416/137, 41 A, 44 A, 43, 50 A, 52 A, 139 A, 136 R, 131 R, 132 B, 202

[56] References Cited

U.S. PATENT DOCUMENTS

| | | | |
|---|---|---|---|
| 478,945 | 7/1892 | Rouse | 170/62 |
| 1,250,263 | 12/1917 | Yates | 416/136 R |
| 1,633,842 | 6/1927 | Bishop | 416/132 B |
| 1,879,935 | 9/1932 | Hill | 416/136 |
| 1,940,200 | 12/1933 | Wingler | 416/135 |
| 1,949,611 | 3/1934 | Martens et al. | 170/173 |
| 2,037,528 | 4/1936 | Miller | 170/68 |
| 2,041,611 | 5/1936 | Kotelevtseff | 170/163 |
| 2,050,142 | 8/1936 | White | 170/68 |
| 2,054,383 | 9/1936 | Ludewig | 416/202 X |
| 2,076,520 | 4/1937 | Swanson | 170/170 |
| 2,080,955 | 5/1937 | Watkins | 416/43 A X |
| 2,134,661 | 10/1938 | Everts | 170/164 |
| 2,253,013 | 8/1941 | Birch | 416/135 |
| 2,275,053 | 3/1942 | Reissner et al. | 416/135 X |
| 2,484,291 | 10/1949 | Hays | 230/60 |
| 2,504,737 | 4/1950 | Sharpes | 416/135 X |
| 2,516,576 | 7/1950 | Jacobs | 416/135 A |
| 4,008,006 | 2/1977 | Bea | 416/271 X |
| 4,029,434 | 6/1977 | Kenney | 416/41 |
| 4,168,439 | 9/1979 | Palma | 290/44 X |
| 4,189,648 | 2/1980 | Harner | 290/44 |
| 4,201,514 | 5/1980 | Huetter | 416/37 |
| 4,257,736 | 3/1981 | Jacobs | 416/51 |
| 4,257,740 | 3/1981 | Duez | 416/137 |
| 4,316,698 | 2/1982 | Bertoia | 416/41 A X |
| 4,348,154 | 9/1982 | Ducker | 416/11 X |

FOREIGN PATENT DOCUMENTS

| | | | |
|---|---|---|---|
| 860029 | 12/1952 | Fed. Rep. of Germany | 416/142 B |
| 886632 | 10/1943 | France | 416/202 |
| 908631 | 4/1946 | France | 416/132 B |
| 971431 | 1/1951 | France | 416/136 |
| 55-148978 | 11/1980 | Japan | 416/41 A |
| 434604 | 9/1935 | United Kingdom | 416/136 R |

Primary Examiner—Everette A. Powell, Jr.
Attorney, Agent, or Firm—Oblon, Fisher, Spivak, McClelland & Maier

[57] ABSTRACT

A windmill including a hub, at least a pair of rotor roots rotatably coupled to the hub and rotor blades mounted on respective rotor roots, wherein wind forces produce rotation of the blades, the roots and the hub around an axis of rotation passing through the hub and the hub defines a plane of rotation perpendicular to the axis of rotation. Each rotor root is mounted in an initial position at a predetermined compound angle with respect to the axis of rotation and the plane of rotation. The rotor roots are spring biased in an initial position and are coupled to each other and to the hub by means of a spring and linkage members disposed in the hub. Upon rotation of the rotors, centrifugal force acts on the rotors in opposition to the spring biasing and produces synchronous rotation of the blade roots relative to the axis of rotation and the plane of rotation thereby decreasing the pitch of the blades with respect to the wind direction and correspondingly controlling the speed of rotation of the rotors.

12 Claims, 11 Drawing Figures

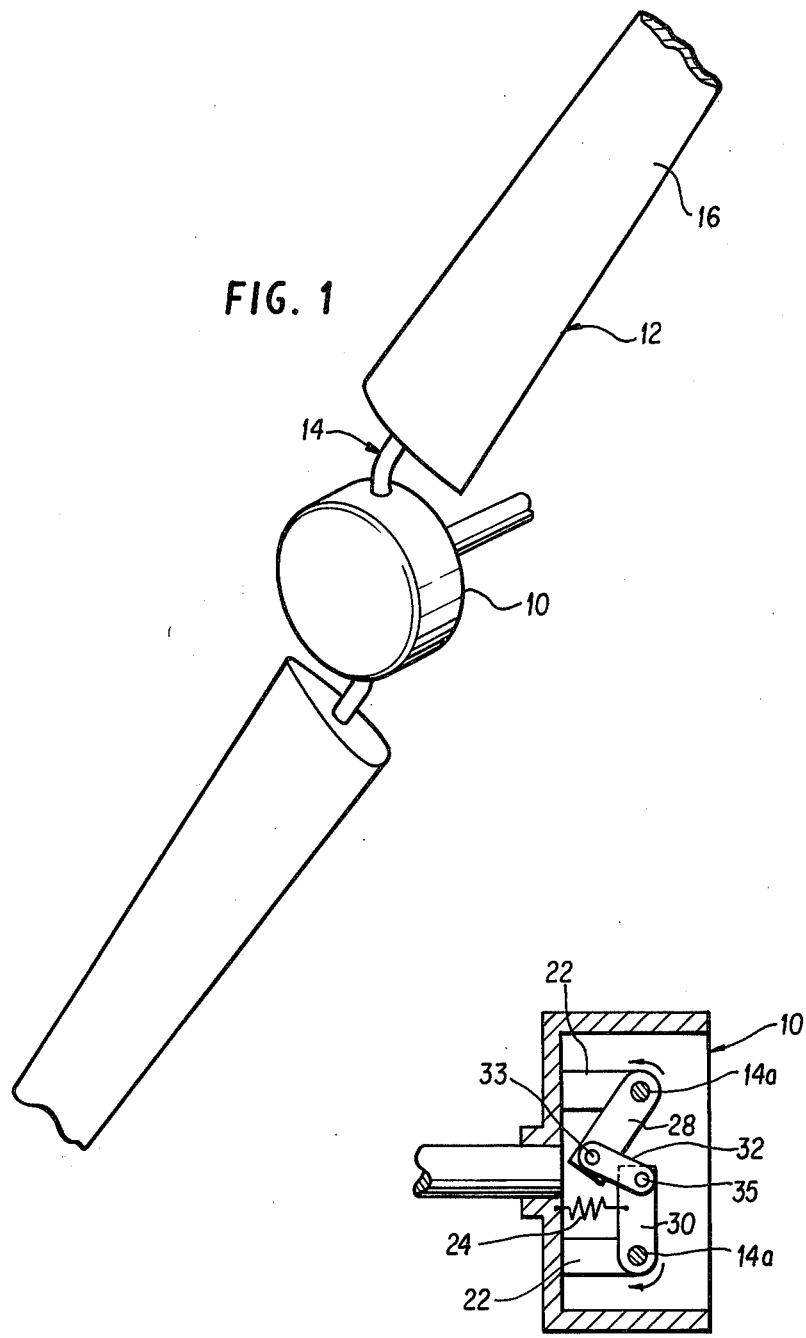

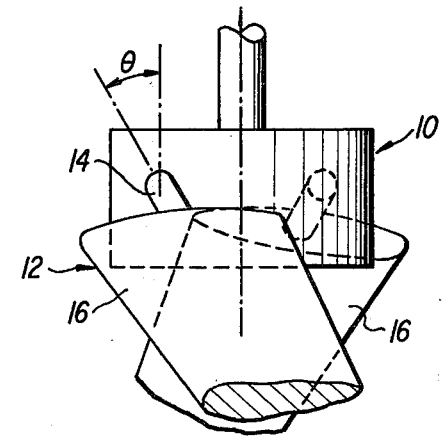
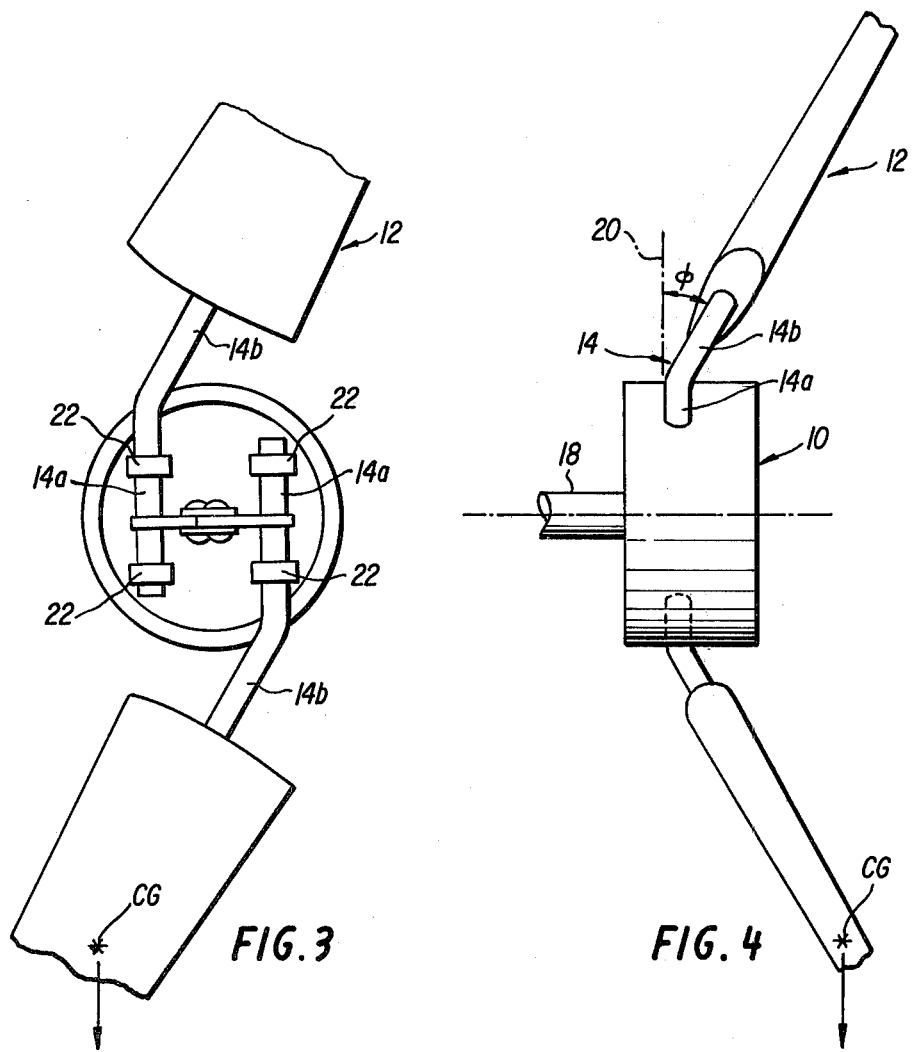

WINDMILL HAVING CENTRIFICALLY FEATHERED ROTORS TO CONTROL ROTOR SPEED

BACKGROUND OF THE INVENTION

1. Field of the Invention

This invention relates to a windmill provided with means for governing the speed (rpm) of a windmill rotor to provide overspeed protection in the event of extremely windy conditions or in the event of rapid change or inadvertent loss of the load demand, and more particularly to a windmill having centrifugally feathered rotors to control the speed of the rotors.

2. Description of the Prior Art

In implementing windmill technology, it is necessary to control or limit the speed (rpm) of the windmill rotors so as not to burn out and destroy an electrical or mechanical load coupled to the windmills, such as a generator or a pump (water-liquid). It is also necessary to limit the rotor speed due to high wind velocity or load disconnection so that the rotor does not overspeed and self destruct.

An early attempt at providing a wind power apparatus having wind rotated rotors mounted so as to be self-governing in terms of rotation speed irrespective of considerable variation in the wind velocity is disclosed in U.S. Pat. No. 2,054,383 to Ludewig. This patent discloses a wind power apparatus including an axle and hub assembly supporting a pair of hinged rotor blades defining a pitch which is varied in dependence upon the speed of rotation by means of the centrifugal forces generated in rotation of the blades. According to Ludewig, centrifugal forces tend to pull the rotor blade into the plane of rotation which has the effect of reducing the power output. Unfortunately, this tendency to flatten the blades in the plane of rotation does not limit the speed of rotation or reduce wind loading on the rotor blades. As a result, the prior art system disclosed in the Ludewig patent is subject to self destruction under "no load" conditions and is not adaptable for large scale windmill systems employing heavy rotor blades.

Other prior art references of interest are the following U.S. Pat. Nos. 478,945; 1,949,611; 2,037,528; 2,041,611; 2,076,520; 2,134,661; 2,253,013; 2,484,291; 4,008,006; 4,029,434; and 4,201,514.

SUMMARY OF THE INVENTION

Accordingly, one object of this invention is to provide a new and improved windmill provided with a simplified means to control the speed of the windmill rotors.

Another object of this invention is to provide a new and improved windmill wherein speed of the windmill rotors is controlled utilizing the centrifugal forces resulting from the rotation of the rotors.

Yet another object of this invention is to provide a novel windmill provided with a means for controlling the speed of the rotors both in the event of high wind conditions and also under no load conditions.

A further object of this invention is to provide a novel windmill including speed control means employing means for biasing the windmill rotors in a predetermined initial position, wherein the requisite biasing forces can be significantly reduced.

Yet another object of this invention is to provide a new and improved windmill capable of operation in a down wind and an upwind condition.

Still another object of this invention is to provide a new and improved windmill having speed control means utilizing the rotational centrifugal forces generated in operation to "feature" or vary the pitch of the rotor blades of the windmill with respect to the wind direction, or stated differently, with respect to the plane of rotation of the blades.

Another object of this invention is to provide a new and improved windmill wherein centrifugally produced rotor feathering is achieved in accordance with the shape and orientation of the windmill rotor root and rotor blade.

These and other objects are achieved according to the invention by providing a new and improved windmill including a hub, at least one rotor rotatably coupled to the hub, the rotor including a root and a rotor blade mounted thereon, wherein wind forces produce rotation of the blade, the root and the hub around an axis of rotation passing through the hub and the hub defines a plane of rotation perpendicular to the axis of rotation. According to the invention, the rotor root is mounted in an initial position at a predetermined compound angle with respect to the axis of rotation and the plane of rotation, with the blade mounted on the root to make a predetermined angle with respect to the plane of rotation when the root is mounted in the initial position. A spring or other source of biasing force is provided to apply a biasing force to the root to maintain the root in the predetermined initial position until the rotational speed of the rotor blade produces sufficient centrifugal force to overcome the biasing force produced by the biasing source. Thus, during operation, when the rotation speed of the rotor exceeds a predetermined value, the centrifugal forces thereby generated oppose and overcome the biasing force applied by the biasing source to produce rotation of the blade root relative to the axis of rotation and the plane of rotation; and concomitant variation of the rotor root compound angle such that the angle of the rotor blade with respect to the plane of rotation is increased, thereby decreasing the pitch of the blade with respect to the wind direction and correspondingly controlling the rotor speed of rotation.

BRIEF DESCRIPTION OF THE DRAWINGS

A more complete appreciation of the invention and many of the intended advantages thereof will be readily obtained as the same becomes better understood by reference to the following detailed description when considered in connection with the accompanying drawings, wherein:

FIG. 1 is a schematic perspective view illustrating the rotor and hub assembly of a windmill constructed in accordance with the invention;

FIG. 2 is a schematic plane view of the rotor and hub assembly shown in FIG. 1;

FIG. 3 is a schematic front elevational view of the assembly shown in FIG. 1;

FIG. 4 is a schematic side view of the assembly shown in FIG. 1;

FIG. 5 is a schematic side view, partially in cross-section, of the hub of the invention, showing in more detail the bias spring and the linkage members synchronizing feathering of the two rotors shown in FIG. 1;

FIG. 6b is a graph of rotor speed versus wind velocity for the rotor and hub shown in FIG. 6a;

FIG. 7b is a graph of rotor speed versus wind velocity for the rotor and hub shown in FIG. 7a;

DESCRIPTION OF THE PREFERRED EMBODIMENTS

Figure 6A:
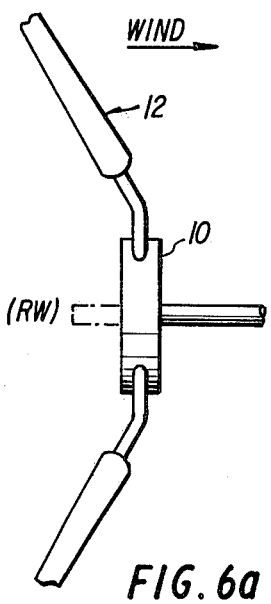
FIG. 6a is a schematic side view showing the rotors in a concave position and the hub of the invention oriented for upwind operation.
Figure 6B:
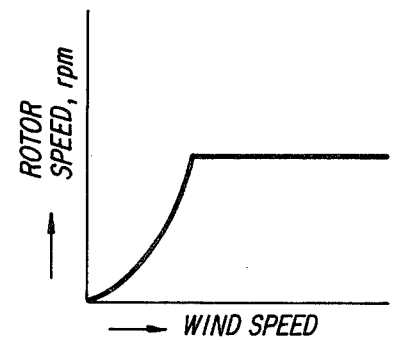

Referring now to the drawings, wherein like reference numerals designate identical or corresponding parts throughout the several views, and more particularly to FIG. 1 thereof, the windmill of the invention includes a hub 10 to which is coupled at least one and usually two or more rotors 12, each rotor being formed of a root 14 having a rotor blade 16 mounted thereon. According to the invention, each root 14 generally includes a member 14a rotatably mounted on the hub 10 and a member 14b extending from the member 14a.

Referring to FIGS. 2 and 3, and as readily understood as those familiar with the windmill art, the hub and rotor are adapted such that wind forces produce rotation of the blade 16, the root 14, and the hub 10 (and also a shaft coupled to the hub) around an axis of rotation 18, passing through the hub. Additionally the hub defines a plane of rotation 20 perpendicular to the axis of rotation 18. As is readily evident, wind forces produce rotation of the hub 10, and rotors 12 around the axis of rotation 18. According to the invention, the centrifugal force developed by such rotation tends to rotate the root 14 into the plane of rotation 20. As a result, the relative angle between the rotor blade 16 and the wind vector, assumed to be perpendicular to the plane of rotation 20, is decreased, and tends to reach a limit of essentially 0° when the centrifugal forces are sufficient to effect rotor rotation into the plane of rotation 20.

As readily understood by those skilled in the art, the blade 16 is mounted in an initial rest position on a respective root 14 to present a predetermined initial angle with respect to the incoming wind vector, again assumed perpendicular to the plane of rotation. The initial positioning of the blade 16 on the root 14 is predetermined according to manufacturer's specifications based on the shape of the individual rotor blade 16.

As shown more explicitly in FIGS. 2-4, the root 14 of each rotor 12 is mounted at a predetermined compound angle with reference to the axis of rotation 18 and the plane of rotation 20. More particularly, each root member 14a defines a plane which cuts an angle $\theta$ with respect to the axis of rotation 18 and an angle $\phi$ with respect to the plane of rotation 20. Each root member 14a is rotatably mounted within a bearing 22 mounted on the hub assembly 10 whereby the blade root is able to rotate within the bearing.

As shown more clearly in FIG. 5, a biasing source shown schematically as a spring 24 is provided to apply a biasing force to each rotor root 14 via a linkage assembly 26 to orient each rotor root 14 at an initial compound angle. As shown in FIG. 5, the linkage assembly 26 includes a first linkage member 28 coupled to the root member 14a of a first rotor root and a second linking member 30 coupled to the root member 14a of a second rotor root 14. The opposite ends 29 and 31 of each of the linkage members 28 and 30 are coupled by respective ends 33 and 35 of a pivot linkage member 32. The spring 24 or other biasing source (such as a pneumatic biasing source) then couples the linkage assembly 26 to the hub at a point in proximity to the pivot linkage member 32 to bias each rotor root in a predetermined compound angle.

As above described, the windmill speed control technique of the invention is based on a very simple use of centrifugal force. By mounting each rotor root 14 at a slight compound angle ($\theta,\phi$) with respect to the axis of rotation 18 and the plane of rotation 20, each root member 14a is able to rotate within the bearing 22, which is of conventional design, mounted on hub 10. The vector of the centrifugal force acting upon the center of mass of each rotor 12 is outward from the hub 10 and parallel to the plane of rotation as shown, for example, in FIGS. 3 and 4. In order to provide the necessary synchronization between the twisting or feathering of the blades 16 according to the invention there is provided the linkage assembly 26 above described. Coupling the linkage assembly 26 to the hub 10 is the spring 24 which provides a biasing force to be overcome by the centrifugal force vector, which sets a working range before feathering occurs and provides a simple means for adjusting the speed threshold at which point feathering takes place.

Figure 7A:
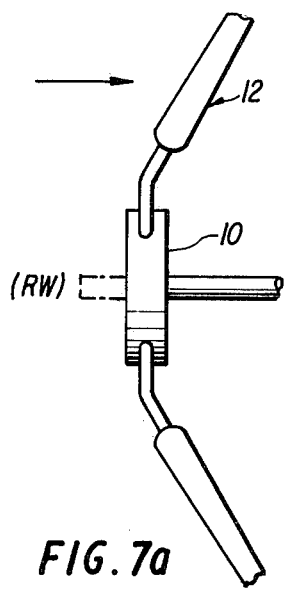
FIG. 7a is a schematic side view illustrating operation in a downwind or convex condition of a rotor and hub according to the invention.
Figure 7B:
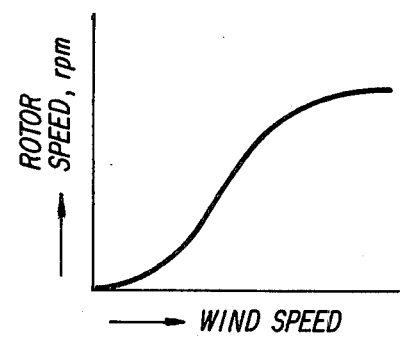

As shown in FIGS. 7a and 8a, it is possible to operate a windmill employing the hub rotor assembly of the invention in either an upwind (concave) or a downwind (convex) condition. When operated in an upwind or concave condition, the centrifugal force vector is in the same direction as the wind force, which results in a relatively abrupt (steeply sloped) rotor speed versus wind velocity characteristic. On the other hand, when the windmill utilizing the hub and rotor assembly of the invention is operated in a downwind or convex condition, the centrifugal forces generated are in opposition to the wind forces, results in a relatively gently sloping rotor speed versus wind velocity characteristic. FIGS. 7b and 8b schematically illustrate the differences in the operating characteristics of the invention when utilized in an upwind concave or a downwind convex configuration, respectively. In each instance, however, it should be understood that the centrifugally induced rotation of the root member 14a within the bearing 22 is such as to decrease the angle between the wind direction and the surface of the rotor blade 16.

Figure 8:
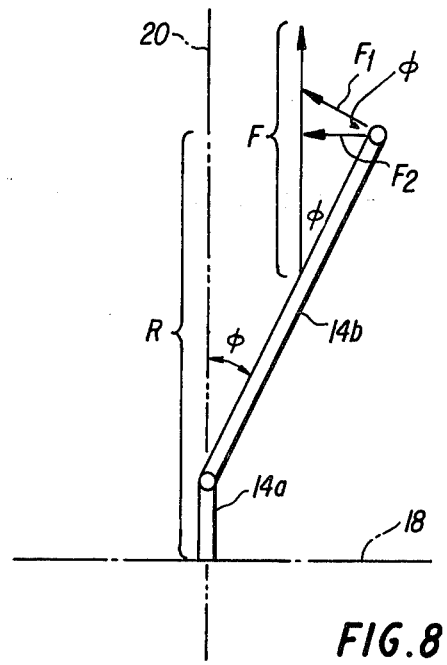
FIG. 8 is a schematic side view of a rotor root and hub illustrating the centrifugal force vector generated during operation of the windmill; and, FIG. 9 is a schematic plane view of a blade root of the invention illustrating the torque vector resulting from the centrifugal force generated during rotor rotation.
Figure 9:
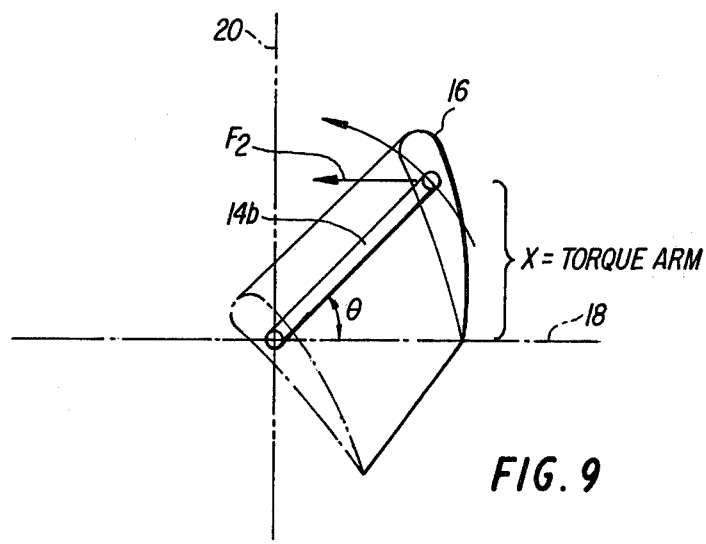

FIGS. 8 and 9 are provided to illustrate the centrifugal forces produced utilizing the windmill of the invention. As shown in FIG. 8, the centrifugal force is generated outwardly parallel to the plane of rotation and is represented by equation 1 as follows:

$$F = Mv^2/R \tag{1}$$

$$F_1 = F \sin \phi \tag{2}$$

$$F_2 = F_1 \cos \phi \tag{3}$$

$$F_2 = MV^2/R \sin \phi \cos \phi \tag{4}$$

$$R = R_1 + R_2 \cos \phi_{max} \tag{5}$$

Where R equals the radius from the axis of rotation 18 to the center of gravity of each rotor 12, $R_1$ equals the length of the root member 14a of each rotor root 14, $R_2$ equals the length of each axially extending portion 14b of each rotor root 14, $\phi_{max}$ is the actual angle between the members 14a, 14b in the plane of the root 14 (for example when $\theta = 0$, $\phi = \phi_{max}$).

In a practical system, it is not expected that $\phi_{max}$ would be selected in a range greater than 20°–30°. In fact, in most systems, $\phi_{max}$ would be less than 10°. For example, $\phi_{max}$ may be selected at approximately 5°. Generally, selection of $\phi_{max}$ depends upon the aerodynamic torque exhibited by the blade, since generally one seeks to minimize the amount of force necessary for control and still maintain control. Therefore, as $\phi_{max}$ becomes smaller, the control force becomes smaller.

It is shown in FIG. 9, the centrifugal force generated during operation of the windmill of the invention can be defined as the product of the torque arm (X) and the component ($F_2$) of the centrifugal force parallel to the axis of rotation. Accordingly, the torque or control force can be defined as follows:

$$\text{torque arm} = X = R_2(\sin \phi_{max})(\sin \theta) \qquad (6)$$

$$\begin{aligned}
\text{torque (or control force)} &= XF_2 \qquad (7)\\
&= \frac{Mv^2}{R} (\sin \phi)(\cos \phi)(R_2 \sin \phi_{max})(\sin \theta)\\
&= M\omega^2(R_1 + R_2 \cos \phi_{max})(\sin \phi)(\cos \phi)(R_2 \sin \phi_{max} \sin \theta)
\end{aligned}$$

where M = mass
$\omega$ = angular velocity
$\phi = \phi_{max}$ when $\theta = 0$
$\phi = 0$ when $\theta$ is 90°

In a practical system, it is unlikely that $\theta$ will be less than 30°. Generally $\theta$ will be 45° or greater, but less than 90°.

As is evident from the above equations, a distinct advantage of the invention resides in the fact that a relatively small spring biasing force is necessary to provide speed control of a relatively large windmill system. This is true because the requisite bias force necessary to establish a speed at which feathering occurs need only overcome the centrifugal forces generated and need not support the entire weight of the rotors. For example, in a three-rotor 60 ton system, (20 tons per rotor) it has been calculated that as little as 1200 pounds of biasing force is necessary, which is a distinct advantage since the system of the invention does not require large bias springs if spring biasing is employed.

As is evident from the above description, the windmill of the invention includes a simple hub and rotor assembly utilizing centrifugal forces generated by rotor rotation to feather the rotor blades thereby to control the speed thereof both in high wind and no load conditions. The feathering produced by the invention is such as to decrease the incident angle between the rotor blade surface and the wind direction, thereby protecting not only the rotor and hub assembly from dangerous high speeds, but also any electrical, mechanical or driven mechanism coupled to the windmill and driven thereby. Thus, in contrast to the prior art patent discussed above which is designed to limit power and torque, but which is otherwise subject to self destruction under no-load conditions, the windmill of the invention provides excellent speed regulation irrespective of wind velocity and load conditions.

Obviously, numerous modifications and variations to the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A windmill comprising:
    a hub;
    at least two rotors mounted on said hub, each said rotor including a rotor root rotatably coupled to said hub and a rotor blade mounted on said root, said hub and each rotor adapted such that wind forces produce rotation of each said blade, each said root and said hub around an axis of rotation passing through said hub, said hub defining a plane of rotation perpendicular to said axis of rotation;
    each said root mounted in an initial position at a predetermined compound angle with respect to said axis of rotation and said plane of rotation, each said blade fixedly mounted on said root at a predetermined angle with respect to said plane of rotation with each said root mounted in said initial position;
    biasing means for applying a force biasing each said root in said initial position;
    linkage means disposed in said hub for synchronizing rotation of the roots of the said rotors with respect to each other, comprising at least a pair of root linkage members each having opposed ends, one end of each of the root linkage members coupling a respective rotor root, and a pivot linkage member having opposed ends coupling respective of the other ends of said root linkage members, said biasing means coupling the other ends of said root linkage members and said pivot linkage to said hub;
    wherein rotation of said hub and each said rotor produces a centrifugal force opposing the biasing force applied by said biasing means, such that when each said rotor and said hub attain a rotation speed exceeding a predetermined value, the centrifugal force thereby generated overcomes said biasing force to produce rotation of each said blade root relative to the axis of rotation and the plane of rotation thereby to vary said compound angle such that the angle of each said blade with respect to said plane of rotation is increased, decreasing the pitch of each said blade with respect to the wind direction, and correspondingly controlling the speed of rotation of said hub and each said rotor.

2. A windmill according to claim 1, wherein said rotor root comprises:
    a first member rotatably mounted on said hub; and
    a second member extending from said first member at a predetermined angle $\theta$ with respect to the axis of rotation and at a predetermined angle $\phi$ with respect to the plane of rotation.

3. A windmill according to claim 2, wherein said angle $\phi$ is less than 30°.

4. A windmill according to claim 3, wherein said angle $\phi$ is less than 10°.

5. A windmill according to claim 4, wherein said angle $\phi$ is approximately 5°.

6. A windmill according to claims 2, 3, 4, or 5, wherein said angle $\theta$ is greater than 30°.

7. A windmill according to claim 6, wherein said angle $\theta$ is greater than 45°.

8. A windmill according to claim 1, further comprising:
   a pair of rotors, each rotor comprising a root mounted in said initial position at said compound angle and a respective blade mounted on said root;
   linkage means for synchronizing rotation of the roots of the said rotors with respect to each other.

9. A windmill according to claim 8, further comprising:
   said linkage means comprising a pair of root linkage members each having opposed ends, one end of each of the root linkage members coupling a respective rotor root, and a pivot linkage member having opposed ends coupling respective of the other ends of said root linkage members; and
   said biasing means coupling the other ends of said root linkage members and said pivot linkage member to said hub.

10. A windmill according to claim 1, wherein said hub comprises:
    bearing mounting means for rotatably mounting said rotor root to said hub.

11. A windmill according to claim 1, wherein said biasing means comprise:
    a spring disposed in said hub.

12. A windmill according to claim 1, wherein said biasing means comprise:
    a pneumatic source.

* * * * *